United States Patent [19]

Jones

[11] 4,107,986

[45] Aug. 22, 1978

[54] FIVE COMPONENT STRAIN GAUGE BALANCE

[75] Inventor: Roy L. Jones, Anaheim, Calif.

[73] Assignee: McDonnell Douglas Corporation, Long Beach, Calif.

[21] Appl. No.: 784,353

[22] Filed: Apr. 4, 1977

[51] Int. Cl.² .................... G01M 9/00; G01L 5/16
[52] U.S. Cl. ................................ 73/147; 73/133 R
[58] Field of Search ........................ 73/133 R, 147

[56] References Cited

U.S. PATENT DOCUMENTS

| 2,582,814 | 1/1952 | Beman et al. | 73/147 |
| 3,618,376 | 11/1971 | Shull et al. | 73/133 R |

Primary Examiner—Charles A. Ruehl

Attorney, Agent, or Firm—Henry G. Kohlmann; Walter J. Jason; Donald L. Royer

[57] ABSTRACT

A five-component strain gauge balance for measuring the forces and moments exerted on a reflection plane model aircraft in a subsonic continuous-duty or blow down wind tunnel. The balance beams are arranged in a diamond pattern so that the rolling moment reactions are concentrated in the side beams making the axial force, normal force and yawing moment felt by the forward and aft beams more accurately measurable. The entire balance is machined from a single piece of material, ensuring maximum repeatability of measurements. This design also simplifies fabrication and provides better access for gauging.

8 Claims, 9 Drawing Figures

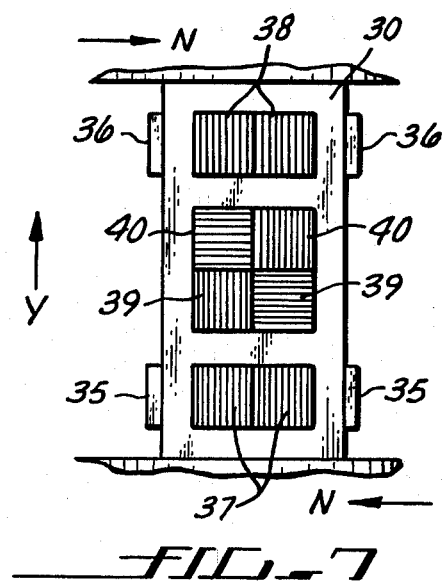
FIG_7
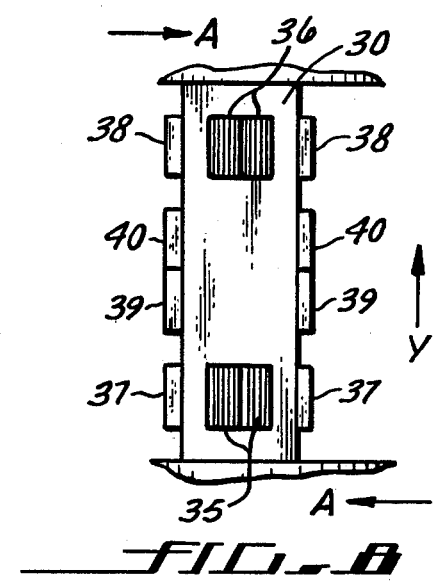
FIG_8
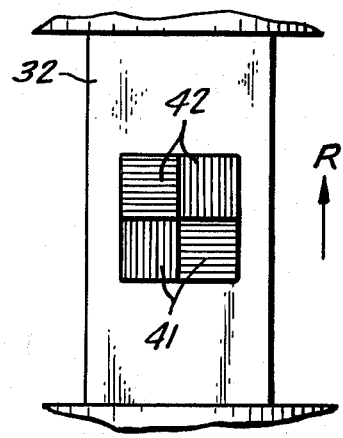
FIG_9

FIVE COMPONENT STRAIN GAUGE BALANCE

BACKGROUND OF THE INVENTION

The present invention relates to an improved balance on which strain gauges are mounted for determining the forces and moments on an aircraft model in a wind tunnel.

There are two general methods of wind tunnel testing of an aircraft model. One, known as sting mounted, is to suspend a model of the aircraft in the center of a wind tunnel by a supporting member which contains the strain gauge instrumentation required to measure the forces and moments generated by the aircraft model in reaction to the air flow. The member supporting the model must be as small as possible so that the forces exerted on the support structure interferes to a minimum extent with the measurement of the forces exerted on the model itself.

The second method, which is the one used in this preferred embodiment, is to attach one half of an aircraft model to a structure near the floor of the wind tunnel by an instrumented balance. This arrangement has two advantages. First, since the model should not occupy more than approximately 1 and 2 percent of the cross sectional area of the wind tunnel, and since only one half of the model is being used, the model scale may be 1.4 times as large for the same blockage area. Second, the balance and other supporting hardware for the model is not in the wind stream and therefore may be constructed in any size and shape that is conducive to the accurate measurement of the aircraft model forces and without regard to the effect of the windstream on the support members themselves.

A unique condition associated with the testing of this type of aircraft model, known as a reflection plane wind tunnel model, is that the force generated by the fuselage half produces what appears to the balance to be a side force. Of course, in the actual aircraft, there would be no side force since, by definition, both halves of the aircraft model would be identical and the resultant side forces would cancel. The instrumentation therefore need not measure this force.

Another general consideration is that the balance flexures, beams and strain gauges should be configured so that a minimum number of strain gauges supply all the data, thereby simplifying and making more accurate the subsequent data reduction.

A variety of balances have been constructed, many capable of measuring the three forces and three moments produced by an aircraft model. However, measuring all six forces and moments represents an unneeded level of complexity for a reflection plane wind tunnel model since the side force is disregarded. Five component balances have been built in a rectangular orientation with beams and flexures in each corner of the rectangle. However, this configuration is not efficient since the large rolling moment reaction forces are felt by all of the balance gauged members, making the separation and measurement of the other forces more difficult.

What is required for the accurate testing of a reflection plane wind tunnel model is a balance optimized for the simple and accurate measurement of the five pertinent components with a minimum of instrumented beam elements to faciliate a simple and accurate data measurement and reduction process.

SUMMARY OF THE INVENTION

The five component balance described herein has its beams and flexures arranged in a diamond configuration wherein virtually all of the rolling moment reaction is taken out by the side beams and flexures, and wherein the remaining forces and moments are measured by the strain of the forward and aft beams. This balance is designed to measure all force and moment components of a reflection plane wind tunnel model except side force, and is designed to maximize the efficiency of the supporting beams and flexures and produce more strain gauge signal for a lesser overall stress and strain, thus providing more accuracy.

There are two basic advantages of this diamond configuration. First, by locating the axial and normal force beams on the longitudinal center line, virtually all of the large rolling moment is taken out by reactions in the side flexures and beams and only a small amount is taken out by the forward and aft instrumented beams. Second, the supporting beams and flexures are oriented and sized for optimum stress and deflection. Thus the beams' and flexures' principal axes are aligned with the pitching moment as well as normal and axial forces, allowing for the accurate measurement of these forces.

This balance is of simple construction, allowing the balance to be machined from a single piece of material. This results in good repeatability, structural rigidity and fabrication simplicity. It is thus an object of this invention to provide a balance for a reflection plane wind tunnel model which is structurally simple but which can be implemented to measure five components of force on a reflection plane wind tunnel model with accuracy and to produce measurements which can be used in a simplified data reduction process.

BRIEF DESCRIPTION OF THE DRAWINGS

FIG. 7 is a front view showing the placement of the strain gauges on the forward beam.

FIG. 8 is a side view showing the placement of the strain gauges on the forward beam.

FIG. 9 is a front view showing the placement of the strain gauges on the side beam.

DESCRIPTION OF THE PREFERRED EMBODIMENT

Figure 1:
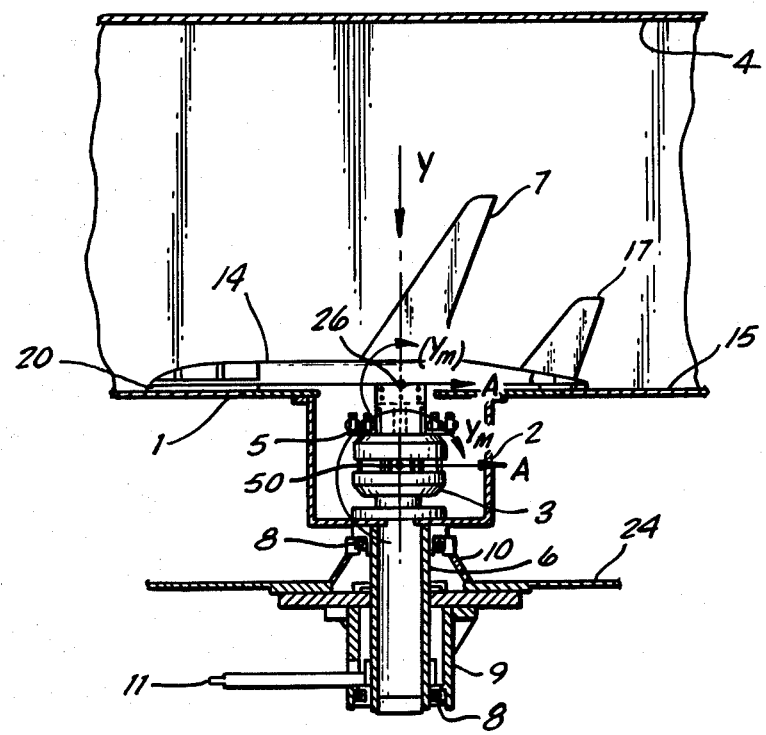
FIG. 1 is a side view of the balance supporting a model and installed on the tunnel pitch mechanism.

FIG. 1 is a side view of the wind tunnel, model, and balance apparatus. The reflection plane wind tunnel model comprises a fuselage half 14, one wing 7, and tail 17. The air space between the fuselage 14 and the wind tunnel floor 15 is sealed with a polyurethane seal 20 which provides a sliding seal between the entire fuselage circumference and the wind tunnel floor. In the preferred embodiment the separation between wind tunnel floor 15 and ceiling 4 is approximately 4 feet and the model wing 7 is approximately 2 feet long.

The aircraft model is mounted on a turntable 1 which may be rotated to present various model pitch angles to the air flow. This turntable 1 is mounted on a tub assembly 2 which contains the balance 3. The balance is connected to the model by mounting hardward 5. The tub assembly and balance are both rotated about the axis by means of a tub support 6 which is driven by a pitch arm assembly 11 and is supported by two bearings 8. The upper bearing support 10 and the lower bearing support 9 connect this apparatus to the tunnel pressure vessel 24. Thus, motion of the pitch arm assembly 11 results in a variation of model pitch. In the proposed embodiment the balance itself is approximately 1 foot square and weighs approximately 160 pounds. Also, since the proposed embodiment is optimized for commercial aircraft, a continuous or intermittent air flow of between Mach 6 to Mach 1 is provided.

Figure 2:
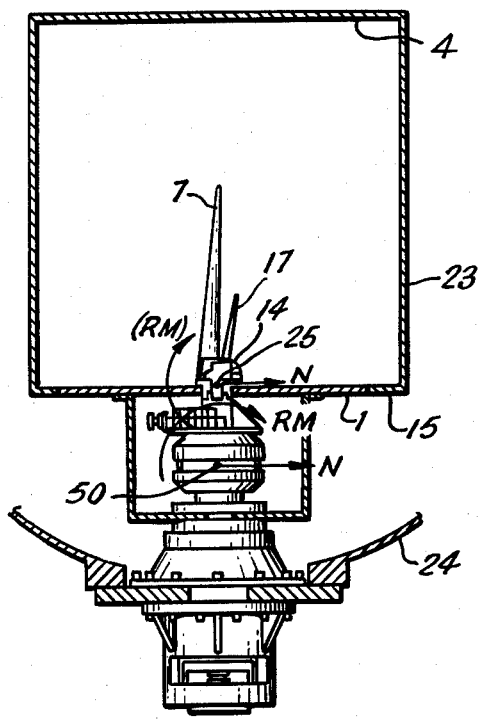
FIG. 2 is a front view of the balance installation.

FIG. 2 is a front view of the balance, model, and wind tunnel and shows the cross sectional areas of the wind tunnel and model in the preferred embodiment.

Figure 3:
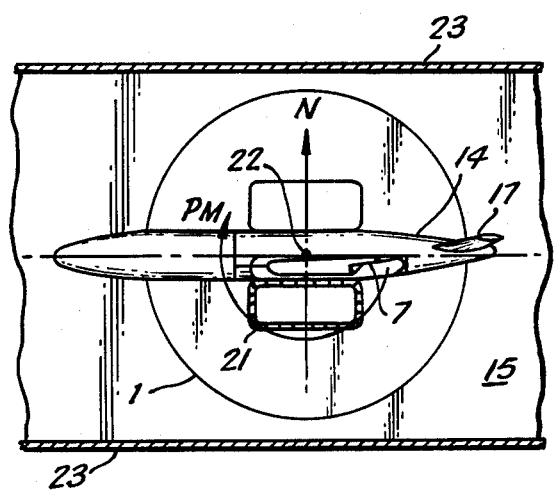
FIG. 3 is a top view showing the orientation of the model over the balance.

FIG. 3 is a top view of the wind tunnel floor 15, the two side walls 23 and the turntable 1. Two access plates 21 are provided so that the instrumentation located on the balance may be accessible from the wind tunnel area.

Figure 4:
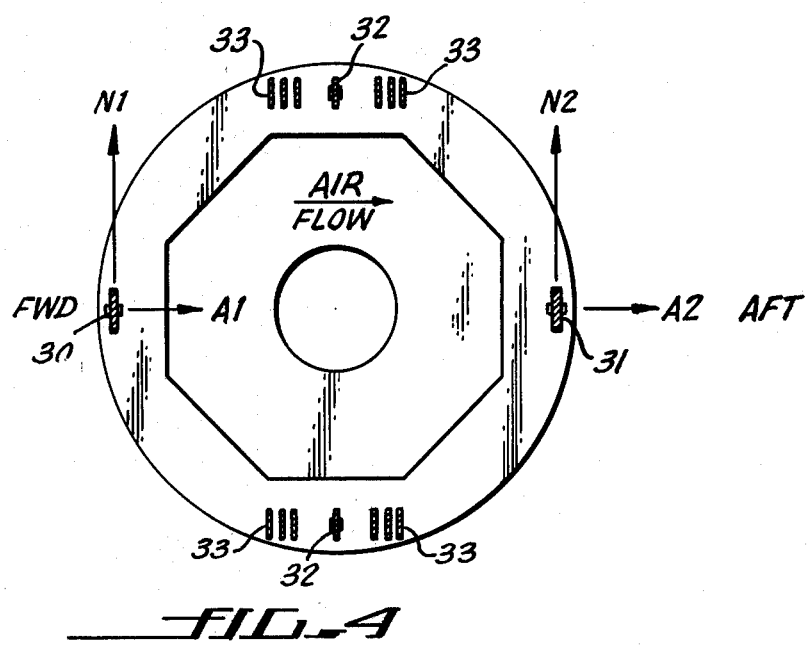
FIG. 4 is a top view of the balance showing the placement of the beams and flexures.

FIG. 4 is a cross sectional top view of the balance showing the relative sizes and positions of the forward beam 30, the aft beam 31 and the two side beams 32 on which the strain gauges are mounted. There are an additional 12 flexures 33, which are not instrumented, for taking out a large part of the rolling moment and a portion of the normal force. The direction of wind flow in the tunnel is from left to right in the direction of the arrow and the lift of the aircraft model will result in a rolling moment at the balance centerline causing compression in one side beam 32 and a tension in the other.

Figure 5:
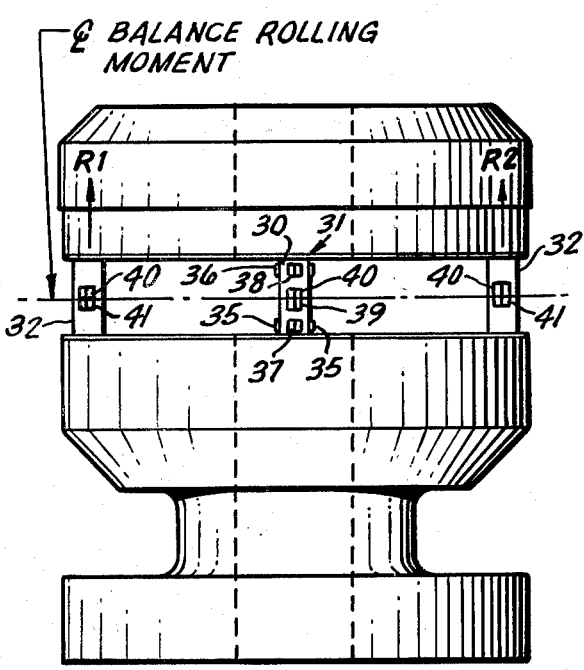
FIG. 5 is a front view of the balance flexures and beams.
Figure 6:
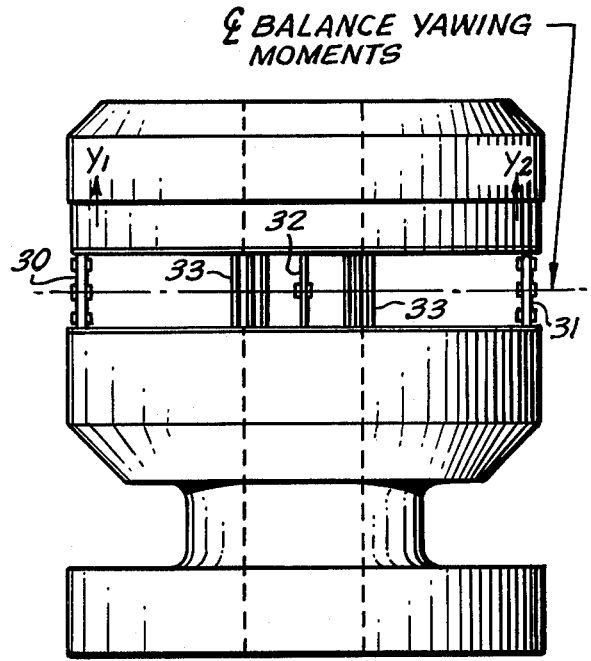
FIG. 6 is a side view of the balance flexures and beams.

FIGS. 5 and 6 are front and side views of the balance. FIG. 5 also shows the positioning of the strain gauges on the balance beams.

The balance resolves, or senses, forces and moments relative to the balance centerlines. From these data, it is common practice to compute moments about some meaningful point on the aircraft model. The airplane model moments herein are enclosed in parentheses, ( ), to distinguish them from moments referenced to the balance center lines.

The normal force is shown in FIG. 2 and is defined as a force to the right which corresponds to the lift of the model. The components of this force, $N_1$ and $N_2$, are shown in FIG. 4 and are derived from strain gauges attached to the bottom portions of the left and right sides of the forward beam 30 and the aft beam 31, where the sides of these beams are defined as the narrow edges. These normal force strain gauges 35 are also shown in FIG. 5. A second set of strain gauges 36, attached to the top portions of the forward and aft beams are provided as spares. In all cases the normal force strain gauge elements are oriented vertically to measure the vertical strain of the beam surfaces due to double cantilever bending at the points of attachment. Normal force N is defined as the addition of normal force components $N_1$ plus $N_2$.

The pitching moment PM is indicated by the arrow of FIG. 3 showing the pitching moment of the aircraft about the center of rotation 22. The pitching moment is derived from the normal forces, and is proportional to (N1−N2).

The axial force A is the equivalent of aircraft drag at zero angle of attack and is shown in FIG. 1 as a force to the right. In FIG. 4 the two components of this axial force are labeled $A_1$ and $A_2$ and are measured by axial force strain gauges 37 on the forward and aft faces of the side beams 32. Each strain gauge is located near the bottom of the beam and measures the vertical strain of the beam surface due to double cantilever bending at the point where it is attached. Spares 38 are also provided. The axial force is proportional to the sum of A1 plus A2.

The side force Y is shown in FIG. 1 as a force against the side of the aircraft and constitutes a force downward on the balance. This force is not measured because it would provide no useful information, and would complicate the balance structure and data reduction process.

In FIG. 2, two rolling moment components are shown. The rolling moment (RM) of the airplane model is shown as a clockwise moment about the model center line 25 and is proportional to (R1−R2) which are shown as two vertical forces applied to the side beam 32 in FIG. 3. The rolling moment RM of the balance is shown in FIG. 2 as a clockwise moment about the balance centerline and is the sum of the rolling moment of the airplane model added to the moment resulting from the normal force multiplied by the distance between the model centerline 25 and the balance centerline 50. Since the rolling moment RM produces relatively large forces flexures 33 are provided in addition to side beams 32 to absorb much of the moment reaction. The rolling moment strain gauges 41 are located at a point slightly below the center line on the forward and aft surfaces of the side beams to measure the tensile and compressive strains and virtually cancel the bending strains. Directly above the center line are spare rolling moment strain gauges 42.

The yawing moment YM at the balance centerline is the sum of the yawing moment (YM) of the airplane model added to the moment resulting from the product of the axial force and the distance from the model moment reference line to the balance center line, shown in FIG. 1 as clockwise moment about the balance center point 50. Yawing moment YM is proportional to (Y1−Y2). Y1 and Y2 are vertical forces applied to the forward and aft beams as shown in FIG. 6 and are measured by the yaw strain gauges 39 which are located immediately below the center line on the forward and aft faces of the forward beam 30 and the aft beam 31. Immediately above each yaw strain gauge is a spare yaw strain gauge 40 as shown in FIG. 8.

FIGS. 7 and 8 are front and side views of the forward beam 30. The aft beam is identical. As is standard in the industry, a balance bridge is implemented from four strain gauges wherein a stretching of the filament in any one leg of the bridge increases the resistance of that leg, unbalancing the bridge. The resultant electrical output is used as the raw data output of the strain gauge.

The balance structure has two axes of symmetry. This structure, combined with the strain gauge bridge wiring, as described below, provide cancellation of thermal expansion strains. In addition, all strain gauges are as a full Wheatstone bridge with the gauges installed back to back for additional thermal compensation.

The yaw bridge is composed of two yaw strain gauges 39 on the front surface of the forward beam and an identical set of filaments on the back surface constituting the four legs of the balanced bridge. As shown, the filaments in the left strain gauge are vertical and the filaments in the right strain gauge are horizontal. In this way a vertical stress results in an increase in the resistance of one filament and, because of Poisson's ratio, a decrease in the resistance of the other filament. This unbalances the bridge resulting in a voltage output. The back surface of the beam is fitted with identical yaw strain gauges which are used to compensate for temperature variations and cancel bending strains. A full set of yaw strain gauges is shown in FIG. 8.

The axial force strain gauges 37 are located toward the bottom of the forward and aft surfaces of the forward beam 30. An identical set is also provided on the aft beam 31, not shown. The filaments of all axial force strain gauges are vertical and provide an indication of vertical stress of the surfaces to which they are attached. A typical axial force, as shown in FIG. 8, may be described as a force against the upper end of the forward beam toward the right with a corresponding reaction force at the bottom of the beam toward the left. In this case the two axial force strain gauges 37 on the left side of the beam in FIG. 8 would be stretched while the two filaments on the right surface would be compressed. These four strain gauges, coupled together to constitute a bridge, would produce an electrical imbalance voltage output. Spare axial force strain gauges 38 are provided.

Normal force strain gauges 35 are located toward the bottom of the side surfaces of the forward beam 30. Identical normal force strain gauges are provided on the aft beam 31, not shown. A normal force on the forward beam 30 would be represented as a force toward the right felt at the top of the forward beam as shown in FIG. 7 and a corresponding reaction force to the left applied to the bottom of the forward beam. These forces would result in the compression of one set of normal force strain gauges 35 and a corresponding extension of the other set of normal force strain gauges resulting in an electrical output. Spares 36 are provided.

FIG. 9 is a front view of one side beam 32 showing the positioning of the rolling moment strain gauges 41. An identical set of strain gauges is mounted on the aft surface of the side beam. A rolling moment produces a vertical force on the side beam which either compresses or extends the strain gauge filaments as determined by Young's modulus and Poisson's ratio of the material, thus unbalancing the bridge. Spare rolling moment strain gauges 42 are also provided.

This balance may be used to determine the forces and moments on a test article in any kind of fluid flow field and may be used in any application where there is a requirement of a rigid structure for making accurate five component force measurements.

While an exemplary embodiment of this invention has been described above and shown in the accompanying drawings it is to be understood that such embodiment is merely illustrative of, and not restrictive on, the broad invention and that I do not wish to be limited in my invention to the specific construction or arrangement described and shown, for various obvious modifications may occur to persons having ordinary skill in the art.

I claim:

1. A balance for measuring forces and moments exerted on a test article in a fluid flow field comprising:
    an upper member having a first upper surface and an opposite first lower surface attached to said test article, the plane of attachment of said upper surface of said upper member and said test article being generally in the plane of said fluid flow field lower boundary,
    a lower member having a second upper surface and an opposite second lower surface attached to a fixed structure, said first upper surface and said second lower surface being symmetrically disposed about a plane parallel thereto,
    a forward beam, an aft beam, and two side beams arranged in a diamond pattern in relation to the direction of fluid flow, connecting said upper and lower members, said forward and aft surfaces of said beams being perpendicular to the direction of fluid flow and wherein the side surfaces of said beams are parallel to the direction of flow to form beams of rectangular cross section when viewed from the top,
    a strain gauge attached to each beam for measuring the strain of each beam, and
    at least one flexure forward of, and at least one flexure aft of each side beam, each flexure connecting said upper and lower members.

2. The apparatus of claim 1 wherein said balance includes
    means for rotating said lower member about its central vertical axis in relation to said fluid flow field to rotate said balance and test article with relation to the flow of said field.

3. A balance for measuring forces and moments exerted on an aircraft model in a wind tunnel wherein half of a model is mounted with the wing in the vertical plane, and with the fuselage half in close proximity to the wind tunnel floor and attached to the top of said balance, comprising,
    an upper member rigidly attached to said model,
    a lower member attached to the wind tunnel structure,
    a forward beam, an aft beam and two side beams arranged in a diamond pattern in relation to the direction of air flow in said wind tunnel rigidly connecting said upper and lower members,
    at least one strain gauge attached to each beam for measuring the strain of each beam, and
    at least one flexure forward of, and at least one flexure aft of, each side beam, each flexure rigidly attached to said upper and lower members.

4. The apparatus of claim 3 wherein said balance includes
    means for rotating said lower member about its central vertical axis with respect to said wind tunnel to vary the pitch of said model with respect to the air flow.

5. The apparatus of claim 4 wherein strain gauges for measuring the balance normal forces, corresponding to the model lift, and for measuring the moment about the balance vertical axis, corresponding to the model pitching moment, are attached to the bottom or top portion of the right or left surface of the forward and aft beams.

6. The apparatus of claim 4 wherein strain gauges for measuring the balance axial force, corresponding to the model drag are attached to the bottom or top portion of a forward or aft surface of the forward and aft beams.

7. The apparatus of claim 4 wherein strain gauges for measuring the vertical strain of said side beams, corresponding to the rolling moment, are attached to the central portion of a forward or aft surface of the side beams.

8. The apparatus of claim 4 wherein strain gauges for measuring the vertical strain of said forward and aft beams, corresponding to the yawing moment, are attached to the central portion of a forward or aft face of the forward and aft beams.

* * * * *